(12) United States Patent
Jaye

(10) Patent No.: US 6,688,283 B2
(45) Date of Patent: Feb. 10, 2004

(54) ENGINE START STRATEGY

(75) Inventor: John R Jaye, Northville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 107 days.

(21) Appl. No.: 09/951,286

(22) Filed: Sep. 12, 2001

(65) Prior Publication Data

US 2003/0047164 A1 Mar. 13, 2003

(51) Int. Cl.[7] ............................................... F02D 31/00
(52) U.S. Cl. .............. 123/352; 123/406.59; 123/406.64
(58) Field of Search ................................ 123/352, 357, 123/406.59, 406.6, 406.64, 339.21, 339.19, 688, 396, 491, 399.11; 477/111

(56) References Cited

U.S. PATENT DOCUMENTS

| | | | |
|---|---|---|---|
| 4,748,567 A | * 5/1988 | Sumizawa et al. | 701/114 |
| 4,928,652 A | * 5/1990 | Shinya et al. | 477/111 |
| 5,027,934 A | * 7/1991 | Benford | 192/85 AA |
| 5,115,698 A | * 5/1992 | Leising et al. | 475/65 |
| 5,174,334 A | * 12/1992 | Nogle | 137/596.17 |
| 5,491,635 A | 2/1996 | Foeldi et al. | |
| 5,809,969 A | 9/1998 | Fiaschetti et al. | |
| 6,055,971 A | 5/2000 | Beechie et al. | |
| 6,065,442 A | 5/2000 | Motose et al. | |
| 6,085,734 A | 7/2000 | DeGroot et al. | |
| 6,568,373 B2 | * 5/2003 | Yuya et al. | 123/491 |

* cited by examiner

Primary Examiner—John Kwon
(74) Attorney, Agent, or Firm—Edwin W. Bacon, Jr.

(57) ABSTRACT

The strategy controls operation of an internal combustion engine in the time period before an oxygen sensor is warmed up sufficiently to provide reliable feedback measurements. It involves using a target speed-time (or event) goal, and then applying feedback, feedforward, and/or adaptive controls on the difference between the target and a measured engine speed. The target speed time (or event) can be programmed into an engine controller as a lookup table. The actual engine speed at each desired time or event can then be compared to the desired speed to obtain a difference value. Fueling, or any other speed control parameters, can be modified based on the difference value using feedback or feedforward routines to correct the measured value toward the target. The fueling or other control parameters can also be adapted for the next start based on any corrections.

18 Claims, 4 Drawing Sheets

ENGINE START STRATEGY

FIELD OF THE INVENTION

The present invention relates generally to internal combustion engines in automotive vehicles and to engine start strategies for controlling the operation of the engine. More particularly, it provides a method of controlling emissions and engine operation during the period immediately following crank startup.

BACKGROUND

Today's automotive engines must meet stringent emission standards. Automotive manufacturers are constantly seeking ways to reduce emissions in their engines in order to protect the environment, meet customer expectations, and comply with government regulations.

Most automotive engines presently employ a sophisticated control system consisting of sensors and feedback algorithms in conjunction with the engine and a catalyst converter. Oxygen sensors play a large role in present day systems that control emissions. They are used to sense oxygen in the fuel/air mixture, in exhaust manifold emissions, and in emissions from catalytic converters. Through feedback control, the output of the oxygen sensors is used to adjust various parameters to achieve better engine performance, including lowered emissions. Examples of the various parameters that can be controlled through feedback control include the amount of fuel injected into the cylinders, the fuel-to-air ratio, and spark timing.

Many automotive vehicles commonly employ an oxygen sensor generally disposed upstream of the exhaust system for sensing the oxygen level in the exhaust gas emitted from the engine. The oxygen sensor can serve to provide a feedback signal to control engine operation and adjust fuel injection to the engine to achieve good engine performance. However, some conventional oxygen sensors are required to warm up to a sufficiently high temperature before an accurate oxygen sensor reading may be obtained. Also, following an engine start, the oxygen sensor and processing devices initially may not have acquired enough information to provide adequate feedback control. Therefore, for a period of time immediately following cold start up of the vehicle engine, the oxygen sensor may not be capable of providing accurate information with which the engine may be controlled to operate to achieve low hydrocarbon emissions.

Additionally, immediately following a cold engine start, the catalyst of the catalytic converter can be ineffective since the catalyst requires a period of time to warm up to a temperature at which the catalyst can operate effectively to burn excess hydrocarbons. As a consequence, hydrocarbon emissions may initially be high due to poor burning of the excess hydrocarbons due to a low temperature catalyst. To add to the problem, an over abundance of fuel in the catalyst may further cool the catalyst, thereby requiring an extended period time for the catalyst to warm up to a sufficient operating temperature.

There is a need to control engine operation and reduce emissions during the period following engine startup and preceding the time when the oxygen sensors can warm up and begin to provide information necessary for feedback control. In many vehicles, emission control during the period following cold start and prior to warm up of the oxygen sensors is attempted, if at all, only by ballistic means that provide no feedback or learning. For example, a temperature sensor may be provided which sets the amount of fuel injection during the startup period according to the ambient temperature. Another approach is described in U.S. Pat. No. 5,809,969 to Fiaschetti. This patent describes an output combustion metric derived from engine speed, acceleration, and jerk. The output data are compared to a desired metric and the difference is used to control an amount of fuel injected.

The techniques practiced up until now have shown less emission reduction than desired during the start up period. The present invention provides a solution that better controls emissions during that period.

SUMMARY OF THE INVENTION

The strategy of the invention controls operation of an internal combustion engine in the time period before an oxygen sensor is warmed up sufficiently to provide reliable feedback measurements. It involves using a target speed-time (or event) goal, and then applying feedback, feedforward, and/or adaptive controls on the difference between the target and a measured engine speed. The target speed time (or event) can be programmed into an engine controller as a lookup table. The actual engine speed at each desired time or event can then be compared to the desired speed to obtain a difference value. Fueling, or any other speed control parameters, can be modified based on the difference value using feedback or feedforward routines to correct the measured value toward the target. The fueling or other control parameters can also be adapted for the next start based on any corrections.

DETAILED DESCRIPTION OF THE INVENTION

Figure 1:
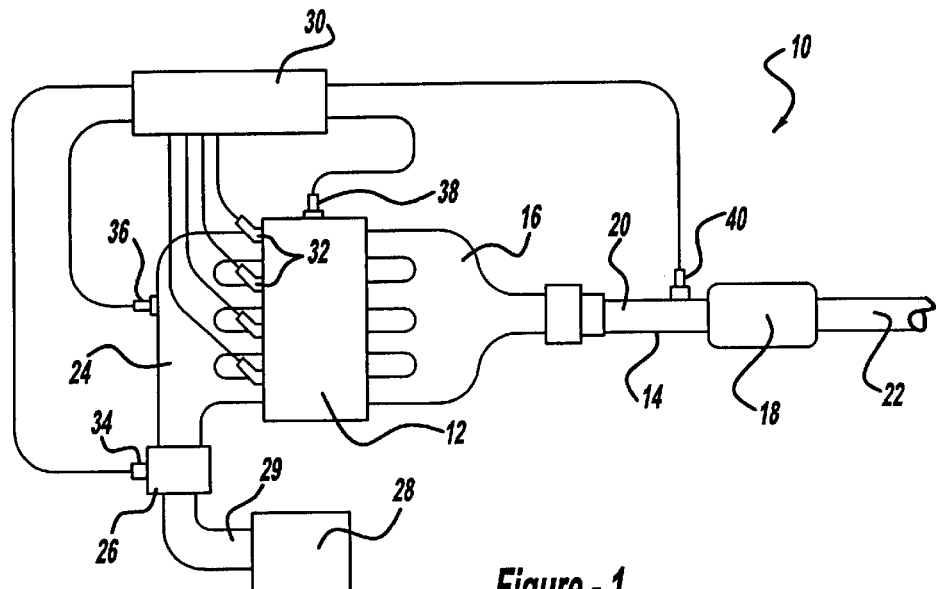
FIG. 1 is a schematic diagram of a startup control system illustrated in operational relationship with an internal combustion engine and exhaust system of an automotive vehicle.

The invention provides a method for controlling the operation of an internal combustion engine in the period immediately following crankstart using measurements of engine speed. The method includes the steps of measuring an engine speed, providing a target engine speed, comparing the engine speed to the target to determine a difference value, and correcting the engine speed toward the target based on the difference value. The method provides a start strategy useful for improving the operation of the internal combustion engine and reducing emissions in the time period before an oxygen sensor can become reliably operational. In one embodiment, the method calls for programming an engine controller to receive input from an engine speed sensor, comparing the engine speed to a target engine speed stored in a lookup table, and calculating a correction to be applied to the engine to correct the engine speed toward the target. Alternatively, comparing the engine speed to the target to determine the difference value may be accomplished by hardware in the engine controller. In a preferred embodiment, the correcting step is carried out using proportional integral derivative (PID) control. The engine speed may be corrected toward the target in a number of ways. In one embodiment, the engine speed is corrected by adjusting the amount of fuel injected into the cylinders. In another embodiment, the correction step is carried out by adjusting the fuel/air ratio of the fuel injected into the cylinders, and in a further embodiment, the engine speed is corrected by adjusting the spark timing. The above embodiments are non-limiting. For example, other well-known techniques may be used to correct the engine. Furthermore, combinations of techniques can be used.

The method is carried out in the internal combustion engine following start-up and until certain disable conditions are met. In various preferred embodiments, the disable conditions can consist of the passage of a certain amount of time, the attainment of a warm-up state by an oxygen sensor in the internal combustion engine, application of throttle by the vehicle operator, or a change of gears by the vehicle operator.

In a preferred embodiment, emissions are reduced during engine start-up by applying a strategy that implements a method containing the steps of measuring an engine speed and comparing the engine speed to a target value to determine a difference value. If the engine speed is less than the target value, actions are taken to increase the engine speed. Such actions include, but are not limited to, increasing the amount of fuel injected, increasing the fuel/air ratio into the engine, and advancing the spark timing of the engine. If the engine speed is greater than the target value, actions are taken which decrease the engine speed. Such actions include, but are not limited to, decreasing the amount of fuel injected, decreasing the fuel/air ratio into the engine, and retarding the spark timing in the engine.

Turning now to FIG. 1, a startup control system 10 is illustrated in operational relationship with an internal combustion engine 12 and an exhaust system 14 of an automotive vehicle (not shown). The exhaust system 14 includes an exhaust manifold 16 connected to the engine 12 and a catalyst 18 such as a catalytic converter connected by an upstream conduit at 20 to the exhaust manifold 16. The exhaust system 14 also includes a downstream conduit 22 connected to the catalyst 18 and extending downstream to a muffler (not shown). The internal combustion engine 12 is a fuel injected engine and includes an intake manifold 24 connected to the engine 12, and a throttle body 26 connected to the intake manifold 24. The engine 12 also includes an air filter 28 connected by a conduit 29 to a throttle body 26. It should be appreciated that the engine 12 and exhaust system 14 are conventional and known in the art.

The startup control system 10 includes an engine controller 30 having outputs 32 connected to corresponding inputs (not shown) of the engine 12. The inputs control a number of parameters affecting the engine speed. In some embodiments, the inputs control spark timing and/or the fuel-to-air ratio. In a preferred embodiment, the inputs are fuel injectors. The fuel injectors meter an amount of fuel to cylinders (not shown) of the engine 12 in response to a pulse width value output from the engine controller 30 via output lines 32. The startup control system 10 also includes a throttle position sensor 34 connected to the throttle body 26 and the engine controller 30 to sense an angular position of a throttle plate (not shown) in the throttle body 26. The startup control system 10 can include a manifold absolute pressure (MAP) sensor 36 connected to the intake manifold 24 and the engine controller 30 to sense manifold absolute pressure. The startup control system 10 also includes an RPM sensor 38 connected to the engine 12 and the engine controller 30 to sense a speed of the engine 12. The startup control system further includes an oxygen sensor 40 connected to the upstream conduit 20 of the exhaust system 14. The oxygen sensor 40 is also connected to the engine controller 30 to sense the oxygen level and the exhaust gas from the engine 12. It should be appreciated that the engine controller 30 and sensors 34, 36, 38, and 40, are conventional and known in the art.

Figure 2:
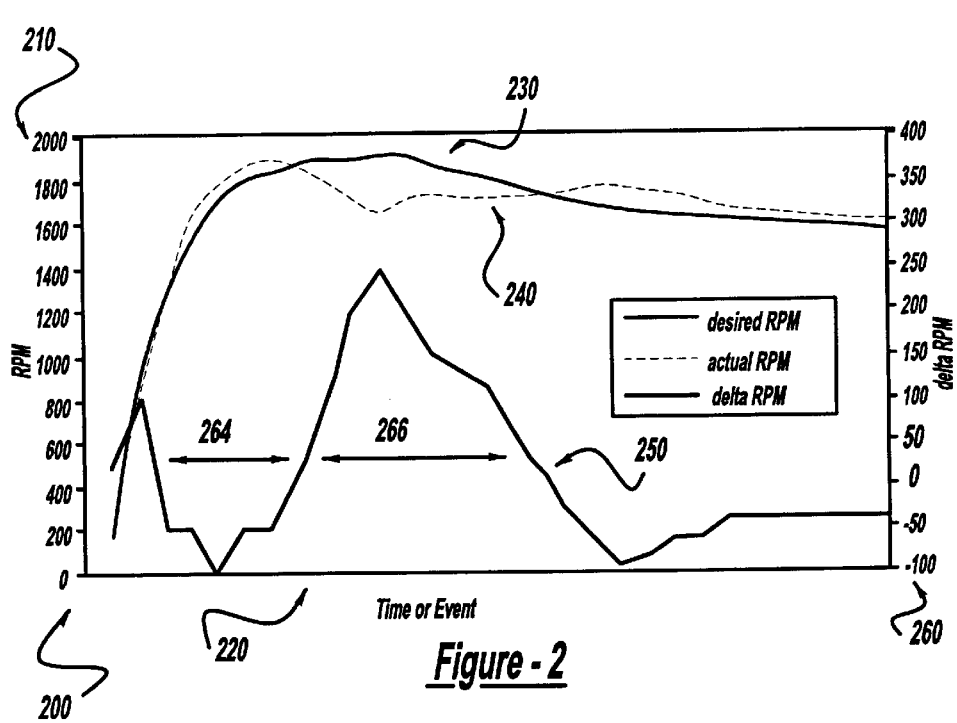
FIG. 2 is graphic illustration of target rpm, actual measured rpm, and difference value as a function of time.

The invention involves the use of engine speed measurements (usually in units of revolutions/minute or RPM) to control the operation of an engine during a startup period while enablement conditions are met. FIG. 2 provides a graphical illustration 200 of the relationship between a target RPM value 230 and a measured RPM value 240. The variable along the abscissa 220 is measured in engine revolutions, time, or engine events. The corresponding values of speed in RPM are given along the speed ordinate 210. A difference value 250 is calculated by subtracting the measured speed 240 from the target speed 230. The difference value is illustrated in units of delta RPM along an ordinate 260. The data shown in FIG. 2 are for illustrative purposes only. It can be seen that in general, the difference between the target value 230 and the measured value 240 can be greater than zero as shown for example, in time range 266. Alternatively, the difference between the target rpm 230 and the measured rpm 240 may take on a negative value as illustrated for the time range 264. As further illustrated below, the present invention involves correcting the engine speed toward the target based on the difference value 250.

Figure 3:
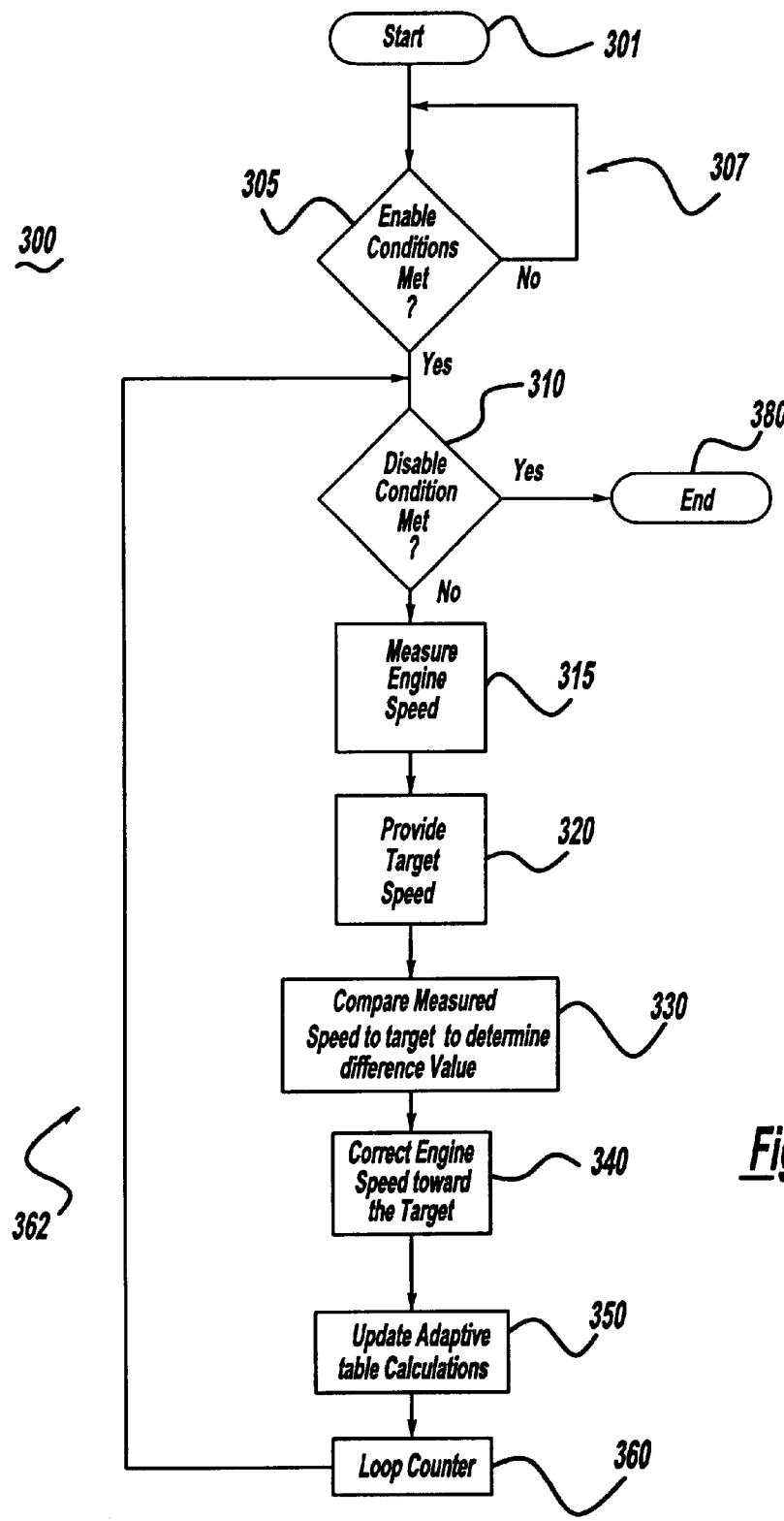
FIG. 3 is a flow diagram illustrating a methodology to control the operation of an engine during the startup period according to a preferred embodiment.

Operation of the invention is illustrated by a methodology 300 as shown in FIG. 3. The methodology 300 begins at a starting position 301 and falls through to a decision block 305. In decision block 305, it is determined whether enable conditions are met for operation of the startup control system of the engine. If enable conditions are not met, the system carries out loop 307 until the enable conditions are met.

Enable conditions are those which signify that the startup control system of the invention should commence. For example, an enable condition may be that the first spark plug has fired. Alternatively, an enable condition may be set as a particular elapsed time after the cranking motor has started moving or has stopped. In another alternative, an enable condition may be chosen to relate to a time after the first spark plug has fired after cranking. The time value in this case may be an actual value of time, or it may be related to a variable proportional to time such as number of engine revolutions. Enable conditions can also be synchronization of the crank and cam position sensors with the electronic control module and/or injection of the first fuel shot.

When enable conditions are met, the methodology 300 then proceeds to decision block 310 where it is determined whether disable conditions are met. Disable conditions may be met for example after a certain lapsed time from the time that enable conditions are met. For example, it may be desirable to set a maximum time of from 30–60 seconds for the startup control system to operate after the enable conditions are met. Alternatively and preferably, disable conditions are related to a situation in the engine allowing for other engine control to engage following a short startup period. A preferred disable condition would be one in which the oxygen sensor 40 has warmed up sufficiently so as to be able to provide useful feedback data to the engine controller 30 based on the composition of the exhaust gas leaving the exhaust manifold 16. Thus in a preferred embodiment, the disable condition is the attainment of a warmed up state by the oxygen sensor. Alternatively, or as a backup, a disable condition may be set to kick in after a total elapsed time of 60 seconds or so in case the oxygen sensor does not warm up in that period. In such a case where the oxygen sensor does not warm up within a predetermined period of time it may be useful to provide that information so as to light a warning light inside the vehicle, and/or store the event of failure of the oxygen sensor to warm up as a maintenance code in the engine controller 30. It is also preferred to provide for disable conditions dependent on certain actions by the vehicle operator. One example of such action is the application of throttle by an operator. In this situation, the output of throttle position sensor 34 can be used by the engine controller to cut short the start up control strategy of the invention. Another example of an action by the operator includes a changing of gears such as an operator would do prior to driving off. In that case, the output of a gear position sensor, not shown, may be used by the engine controller to cut off the operation of the start up strategy of the invention. When any of the disable conditions are met the methodology 300 proceeds to an end block 380.

Until the disable conditions are met, the methodology 300 calls for first going to block 315 where the engine speed is determined. This may be accomplished by programming the engine controller 30 to read a current value from the RPM sensor 34 or to calculate the engine speed based on a timer (not shown) and edges on a rotating component of the engine (also not shown). The next step in the methodology calls for going to block 320 where a target engine speed is provided. The target speed may be provided, for example, as a lookup table in the engine controller 30. Next, in block 330 the measured engine speed is compared to the target value to determine a difference value, as illustrated schematically in FIG. 2. In block 340 the engine speed is corrected toward the target. In an optional step 350 the adaptive table calculations are updated, as illustrated further in FIG. 5. Following optional step 350, the methodology proceeds to counter block 360 where the loop counter is incremented and the methodology proceeds along loop 362 back to before the decision block 310. Thereafter, the methodology 300 calls for reiteration of loop 362 until the disable conditions are met.

The comparison of measured speed to target speed to determine the difference value carried out in block 330 can be accomplished using software, hardware, or a combination of both. The correction of the engine speed toward the target in block 340 can generally be accomplished by adjusting any number of engine control parameters, preferably in conjunction with proportional integral derivative (PID) control. Examples of such engine control adjustments include, without limitation, fuel, fuel/air ratio, and spark. In general, an increase in fuel injected into the cylinders will increase the engine speed whereas a decrease in the amount of fuel injected will generally lead to lower engine speed. Likewise, an adjustment of the fuel-to-air ratio to a more fuel rich region will tend to increase the engine speed while a change to a leaner fuel/air mixture will generally lead to a decrease in engine speed. Along similar lines, an advance in spark timing will generally increase the engine speed, while a retardation of the engine spark will, all things being equal, generally act to reduce the engine speed.

Figure 4:
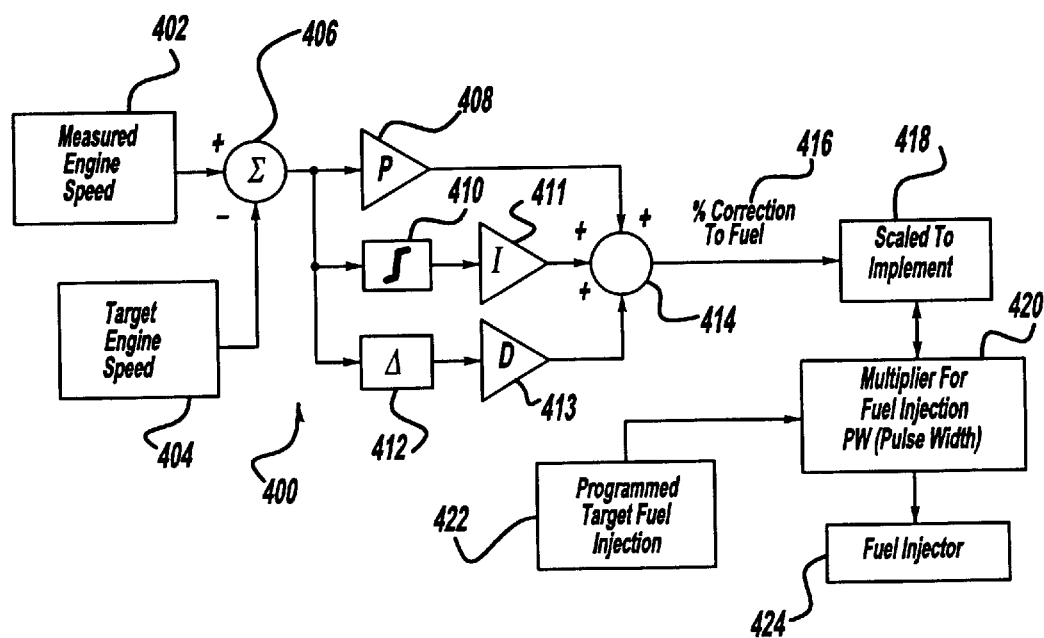
FIG. 4 is a flow diagram illustrating use of the measured engine speed to modify fuel injection to an engine according to the present invention.

Referring to FIG. 4, a methodology 400 is illustrated for modifying the fuel injection pulse width signal to fuel injectors of the engine as a function of the difference value according to the present invention. Methodology 400 calls for the measured engine speed 402 resulting from block 315, and the target engine speed 404 resulting from block 320 to be provided as input to comparator 406. Comparator 406 outputs a difference value between the measured engine speed and the target engine speed and provides proportional-integral-derivative (PID) control.

The PID control includes a proportional (P) gain block 408, an integral (17) block 410, and a derivative (Δ) block 412. Each of the proportional, integral and derivative blocks 408, 410, and 412, respectively, receives the output from comparator 406. The output from the proportional gain block 408 is applied to a summation block 414. The output of the differential block 412 is applied to a gain (D) block 413 and then output to the summation block 414. The summation block 414 sums the inputs so as to provide a percentage correction value 416 that in turn is used to modify the fuel injection to the engine. The percentage correction value 416 is scaled in block 418 for implementation as a multiplier value. Scaling of the percentage correction value may be accomplished by adding 1.0 to the fractional percentage correction value 416 that in turn is used to modify the fuel injection to the engine. Methodology 400 provides a multiplier for the fuel injection pulse-width such that the amount of fuel injected to the engine may be reduced from the scheduled amount provided in a programmed target fuel injection value 422. Accordingly, the programmed target fuel injection 422 is scaled by way of the multiplier 420 to realize a reduction of fuel supplied by the fuel injectors as provided in block 424.

The current invention calls for measuring an engine speed and providing a target engine speed, followed by comparing the engine speed to the target to determine a difference value and correcting the engine speed toward the target based on the difference value. As discussed above, correcting the engine speed towards the target is accomplished by a variety of means including increasing or decreasing the amount of fuel injected into the cylinders, changing the fuel/air mixture of the charge, and altering the spark timing. Correcting the engine speed toward the target preferably operates under PID control so that changes in the above parameters may be estimated so that on application, the engine speed is brought as close as possible to the target speed.

Figure 5:
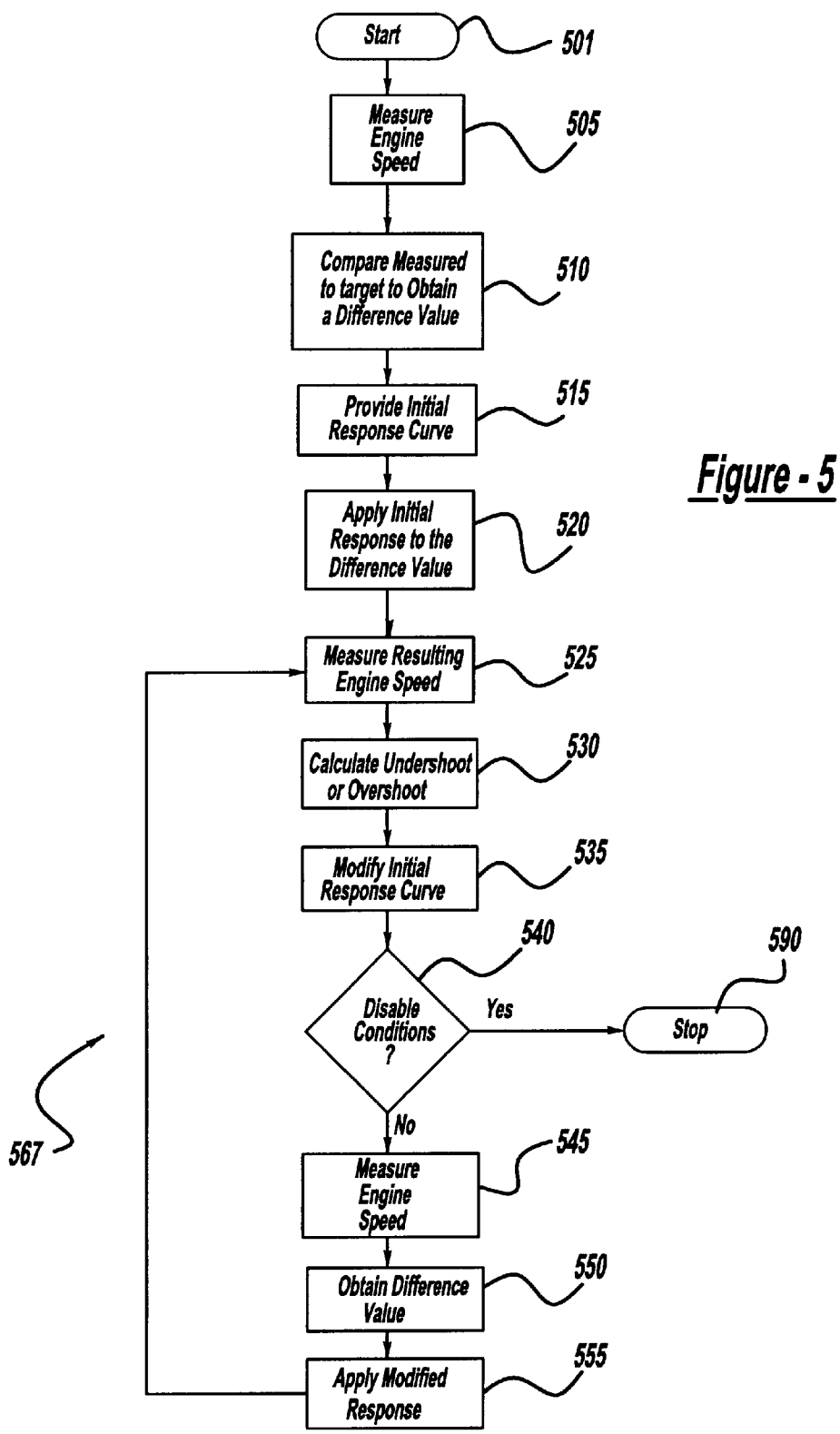
FIG. 5 is a flow diagram illustrating a preferred embodiment of the invention wherein adaptive table calculations are performed to allow the system to learn how to control engine speed during startup.

In a preferred embodiment, the invention calls for further increasing the accuracy of the adjustments made to the engine speed by allowing the system to "learn" a required response. An example of one embodiment allowing for such system learning is illustrated by a methodology 500 in FIG. 5. In FIG. 5 after start block 501 it is assumed that the enable conditions are met and the disable conditions are not met. In block 505, an engine speed is measured and the methodology proceeds to block 510 where the measured engine speed is compared to a target engine speed to obtain a difference value. In block 515 there is provided an initial response curve. The response curve gives generally the value of the correction parameters to be applied to the engine so as to change a measured engine speed to the desired target speed. In block 520, the initial response value is applied to the difference value to correct the engine speed toward the target.

The initial response curve may be a simple function, or it may be a more complex function based on empirical observations. For example, in the case of small deviations of engine speed from target value, the initial response curve may call for proportional increases or decreases to, for example, the amount of fuel to be injected into the cylinders. As an illustrative example, if the engine speed is measured to be 10% higher than the target value, the initial response curve may call for a decrease of fuel injection by 10%. After applying the initial response curve to the difference value, the resulting engine speed is measured in block 525 and the amount of undershoot or overshoot relative to the target speed is calculated in block 530. Based on the calculated undershoot or overshoot, the initial response curve is modified in block 535 and the methodology proceeds to decision block 540. If disable conditions are not met, the methodology calls for continuing to block 545 where again the engine speed is measured. In block 550 a difference value is obtained by comparing the measured engine speed to a target engine speed. Next, in block 555 the modified response is applied to the difference value to correct the engine speed toward the target. Thereafter, the methodology calls for loop 567 to be repeated until disable conditions are met resulting in proceeding to stop block 590.

In a preferred embodiment, the methodology of FIG. 5 is implemented by programming the engine controller 30. In other embodiments not shown in methodology 500, other parameters may be taken into account in order to modify the initial response curve in block 535 based on calculation of the undershoot or overshoot in block 530. For example, it may be desirable to measure other engine parameters such as engine coolant temperature or absolute manifold pressure to determine the modification of the response curve as a function as those parameters. It may also be desirable to include a measurement of the ambient temperature in order to determine the modification to the response curve. In this way, the system can learn how best to correct the engine speed toward the target based on the difference value depending on a variety of engineering and environmental parameters. It is straightforward to implement the above by writing software for the engine controller 30.

The invention has been described in above in relation to certain preferred embodiments. It will be appreciated by those of skill in the art that modifications may be made to the subject matter disclosed without limiting the scope of the invention except as given in the appended claims.

What is claimed is:

1. A method for controlling operation of an internal combustion engine in a period beginning when enable conditions are met, immediately following crank start and ending when disable conditions are met using measurements of engine speed, comprising:

measuring the engine speed;

providing a target engine speed;

comparing the engine speed to the target engine speed to determine a difference value; and correcting the engine speed toward the target engine speed based on the difference value.

2. A method according to claim 1, wherein the target engine speed is provided in a lookup table.

3. A method according to claim 1, wherein the comparing step is accomplished by software.

4. A method according to claim 1, wherein the comparing is accomplished by hardware.

5. A method according to claim 1, wherein the correcting comprises adjusting a quantity of fuel injected into the engine.

6. A method according to claim 1, wherein the correcting comprises changing a fuel/air ratio within the engine.

7. A method according to claim 1, wherein the correcting comprises changing a spark advance setting within the engine.

8. A method according to claim 1, wherein the correcting is carried out using proportional-integral-derivative control.

9. A method according to claim 1, wherein the internal combustion engine is in a closed throttle condition prior to the measuring.

10. A method according to claim 1, wherein the enable conditions comprise at least one selected from the group consisting of a throttle of the engine being closed, a spark plug of the engine having fired, synchronization of crank and cam sensors having been achieved, cranking of the engine having occurred, and combinations thereof.

11. A method according to claim 1, wherein the disable conditions comprise attainment of a warm up state by an oxygen sensor associated with the engine.

12. A method according to claim 1, wherein the disable conditions comprise application of throttle to the engine by an operator.

13. A method according to claim 1, wherein the disable conditions comprise a changing of gears associated with the engine.

14. A method for reducing emissions during engine startup and carried out until disable conditions are met, comprising:

measuring an engine speed;

comparing the engine speed to a target value;

increasing an amount of fuel injected into the engine if the engine speed is less than the target value; and decreasing the amount of fuel injected into the engine if the engine speed is greater than the target value.

15. A method according to claim 14, wherein the disable conditions comprise attainment of a warm-up state by an oxygen sensor associated with the engine.

16. A method according to claim 14, wherein the disable conditions comprise application of throttle to the engine by an operator.

17. A method according the claim 14, wherein the disable conditions comprise a changing of gears.

18. A method for reducing emissions during engine startup and carried out until disable conditions are met, comprising:

measuring an engine speed;

comparing the engine speed to a target value;

advancing a spark setting in the engine if the engine speed is less than the target value; and retarding the spark setting in the engine if the engine speed is greater than the target value.

\* \* \* \* \*